United States Patent [19]
Kang

[11] Patent Number: 5,847,768
[45] Date of Patent: Dec. 8, 1998

[54] APPARATUS FOR CONVERTING SCREEN ASPECT RATIO

[75] Inventor: Kyung Jin Kang, Seoul, Rep. of Korea

[73] Assignee: LG Electronics Inc., Seoul, Rep. of Korea

[21] Appl. No.: 637,900

[22] Filed: Apr. 26, 1996

[51] Int. Cl.⁶ ........................................................ H04N 7/01
[52] U.S. Cl. ........................................... 348/445; 348/904
[58] Field of Search .................................... 348/445, 556, 348/441, 458, 904, 913; H04N 7/01

[56] References Cited

U.S. PATENT DOCUMENTS

| | | | |
|---|---|---|---|
| 5,032,917 | 7/1991 | Aschwanden | 348/904 |
| 5,182,644 | 1/1993 | Kimata et al. | 348/904 |
| 5,298,994 | 3/1994 | Watanabe et al. | 348/445 |
| 5,475,442 | 12/1995 | Matsushita et al. | 348/445 |
| 5,541,651 | 7/1996 | Iura et al. | 348/445 |
| 5,548,337 | 8/1996 | Kang | 348/445 |

*Primary Examiner*—Victor R. Kostak

[57] ABSTRACT

An improved screen aspect ratio conversion apparatus displays a 4:3 broadcast signal on a screen having an aspect ratio of 16:9 by expanding the screen aspect ratio to 4:3 in an interpolation unit and by removing a portion exceeding a certain range of the screen aspect ratio of 16:9. The apparatus includes a line interpolation unit for multiplying the first three lines and next three lines of video data by different coefficient values; a line selection unit for selecting at every line video data interpolated by the line interpolation unit in accordance with a selection control signal and video data obtained by a data storing unit; a sum unit for summing video data obtained by the line selection unit; a horizontal synchronous count unit for counting a start portion of a horizontal synchronous signal to be zoomed and generating a write enable signal when the horizontal synchronous signal reaches a zooming region; and a field memory unit for storing video data which are zoomed at 3:4 by the data sum unit in accordance with a write enable signal of the horizontal synchronous count unit. The apparatus further includes a side panel inserting unit for inserting a luminance level value of a side panel into video data from the second storing unit in accordance with selection control signals.

33 Claims, 8 Drawing Sheets

INPUT SCANNING LINE | INSERTED SCANNING LINE | PICTURE OUTPUT SCANNING LINE

FIG. 7A
| WRITE | | A | | C | | E | | A | | C |
|---|---|---|---|---|---|---|---|---|---|---|
| READ | | | A | A | C | C | X | E | E | A | A |
K →     1    ¼    2/4    ¾    0    ¾    2/4    ¼    1
START ↓
FIG. 7B
| WRITE | F | | B | | D | | F | | B | |
|---|---|---|---|---|---|---|---|---|---|---|
| READ | | X | B | B | D | D | | F | F | X |
1−K →     0    ¾    2/4    ¼    1    ¼    2/4    ¾    0
FIG. 8A
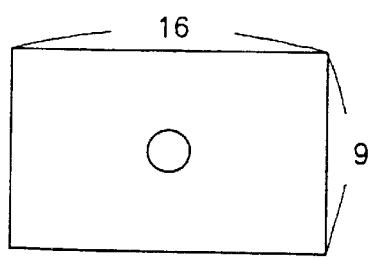
FIG. 8B
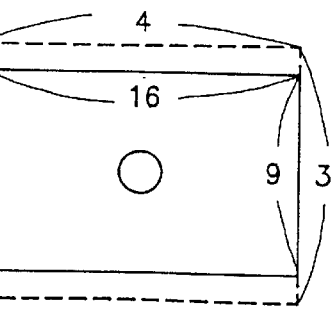

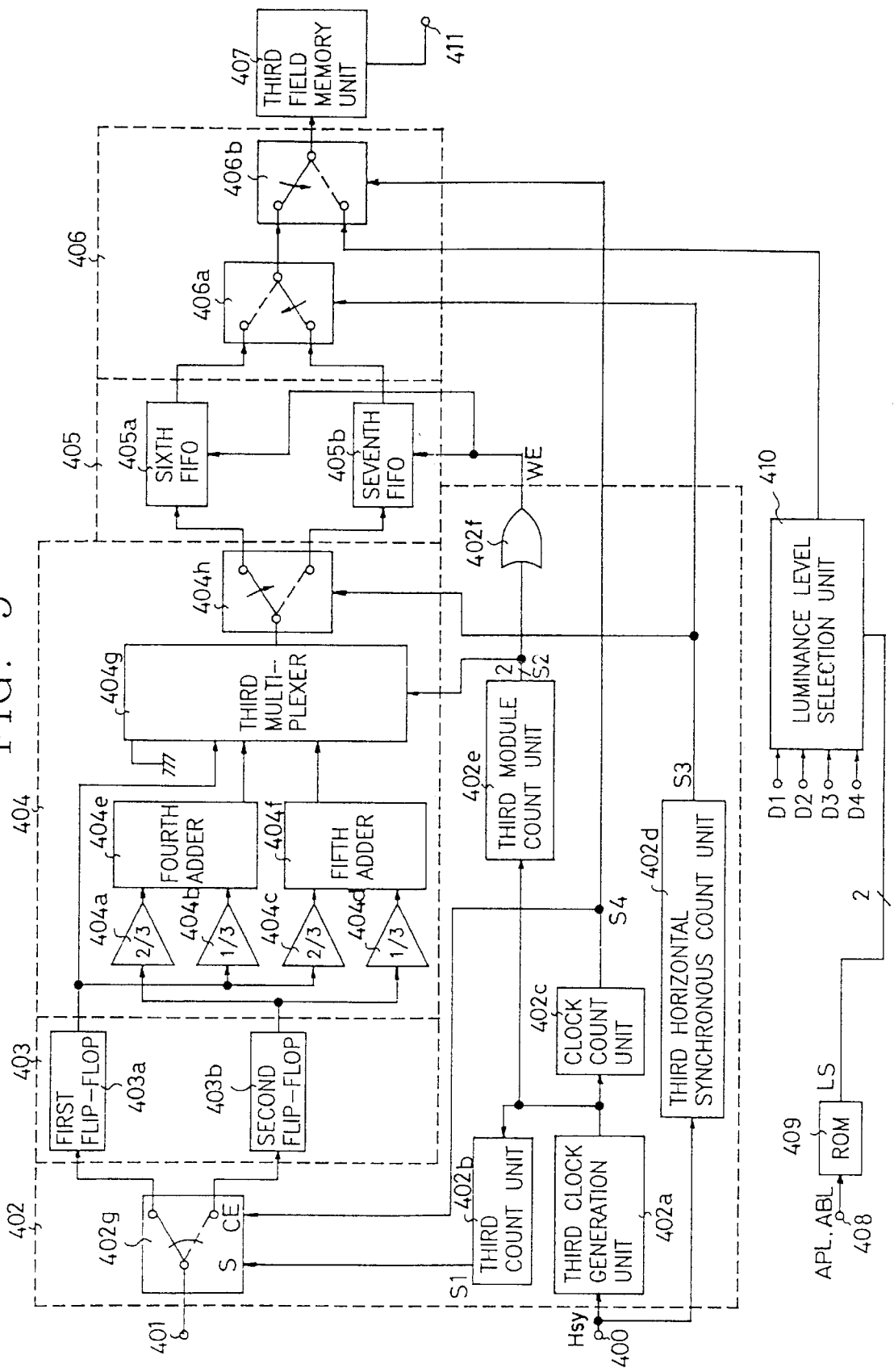

FIG.11A
FIG.11B
FIG.11C
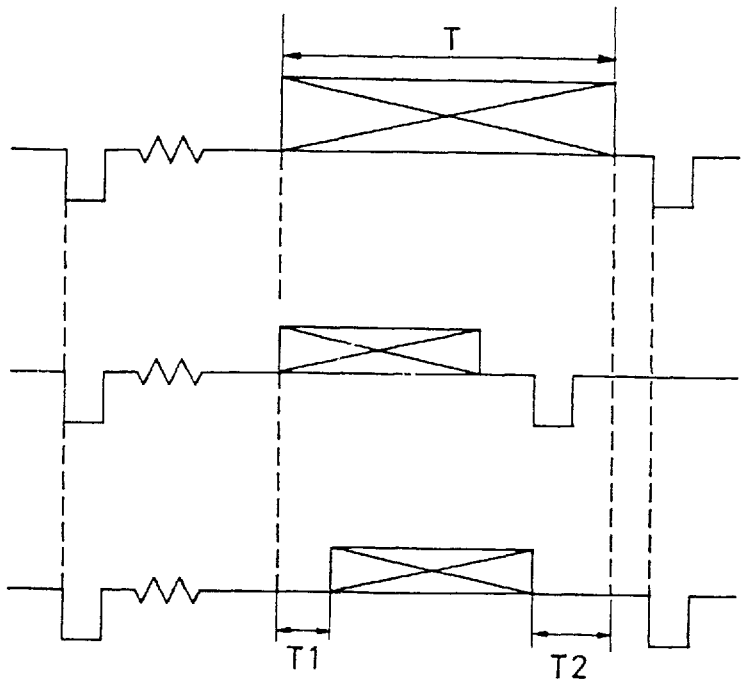
FIG.12A
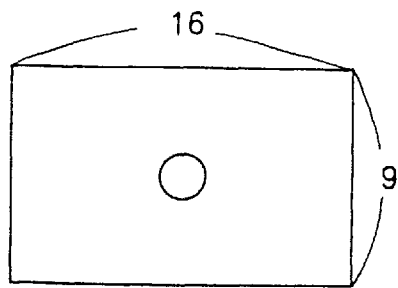
FIG.12B
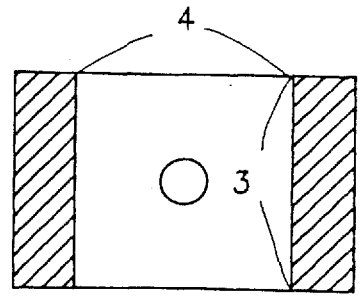

APPARATUS FOR CONVERTING SCREEN ASPECT RATIO

BACKGROUND OF THE INVENTION

1. Field of the Invention

The present invention relates to an apparatus for converting a screen aspect ratio, and particularly to an improved apparatus for converting a screen aspect ratio which is capable of displaying a broadcast signal having a screen aspect ratio of 4:3 by converting the number of scanning lines of the screen of a wide screen television having a screen aspect ratio of 16:9.

2. Description of the Conventional Art

Generally, a letter box format in an NTSC broadcasting method and a PAL broadcasting method is referred to as a method of darkening upper and lower portions of a screen with a lower video of 3:4 of an active picture region. That is, a video signal is transmitted in a letter box format so that a picture having an aspect ratio of 16:9 can be displayed on a television having a screen aspect ratio of 4:3 without picture distortion.

As the technology on the wide screen television having a screen aspect ratio of 16:9 advances, a method of displaying a 4:3 picture signal on a television having a screen aspect ratio of 4:3 is needed.

As the wide screen television is widely used, a broadcasting station transmits a broadcasting signal by combining a 4:3 program and a 16:9 program for co-use in the 4:3 screen television and the 16:9 wide screen television.

In addition, it is necessary to automatically detect a wide screen signal (WSS) which indicates whether a program transmitted from the broadcasting station is referred to as a 4:3 program or a 16:9 program. It is also necessary to expand the screen of a wide screen television.

Then, the number of scanning lines of a picture needs to be changed to receive a 4:3 program using a 16:9 wide screen television set.

Referring to FIG. 1, a conventional scanning line conversion unit for displaying a 4:3 video signal on a 16:9 screen of a wide screen television includes a field memory unit 101 for sequentially storing at every field a 4:3 digital video signal DCV outputted through an input terminal 100 for a set screen aspect ratio and for outputting a stored video data at every horizontal scanning interval by one line; a first line memory unit 102 for storing the video data stored in the field memory unit 101 at every line; a second line memory unit 103 for storing previous video data stored in the first line memory unit 102; a first multiplier 104 for multiplying a previously set coefficient value 1–k inputted thereto through a coefficient input terminal 106 by a video data delayed and inputted thereto by one line from the first line memory unit 102; a second multiplier 105 for multiplying a previously set coefficient value k inputted thereto through the coefficient input terminal 106 with a video data delayed and inputted by one line from the second line memory unit 103; and a sum unit 107 for summing the current video data obtained by the first multiplier 104 and the previous video data obtained by the second multiplier 105 and for outputting a video signal. As a result, the number of scanning lines is changed and output through the output terminal 108.

In the conventional scanning line number conversion unit for viewing a predetermined picture in a zoom mode by multiplying by 4/3 times the number of scanning lines of a wide screen television having a screen aspect ratio of 16:9, when a digital video signal DCV having a screen aspect ratio of 4:3 is inputted, the field memory unit 101 sequentially stored a digital video signal having a screen aspect ratio of 4:3 at every field. That is, the field memory unit 101 stores the signal at every third line, making the third line a fourth line by emptying the fourth line.

In addition, from the field memory unit 101, the video signal is applied to the first line memory unit 102 by one line at every horizontal scanning interval.

The first line memory unit 102 sequentially stores a digital video data which is inputted thereto at every second line at every third line from the field memory unit 101, and outputs the stored video data to the second line memory unit 103 and the first multiplier 104 as the fourth line.

The second line memory unit 103 delays the video data inputted by the first line memory unit 102 by one line and outputs the delayed output to the second multiplier 105.

The first and second multipliers 104 and 105 multiply the video data value inputted thereto from the first and second line memory units 102 and 103 by coefficient values 1–k and k from the coefficient input terminal 106.

The sum unit 107 sums video data outputted from the first and second multipliers 104 and 105, and outputs video data, having a new number of scanning lines obtained by the sum operation of the sum unit 7, through the output terminal 108, so that a video signal having a screen aspect ratio of 4:3 as shown in FIG. 2A is inserted into scanning lines and displayed on the entire vertical region of a screen having an aspect ratio of 16:9 shown in FIG. 2B.

With reference to FIGS. 3 and 4 in describing the above operation in more detail, the first multiplier 104 multiplies the video data inputted thereto from the first line memory unit 102 by coefficient value of 1–k, and the second multiplier 105 multiplies the video data outputted from the second line memory unit 103 by a coefficient value of k.

The video data multiplied by the first and second multipliers 104 and 105 are added by the sum unit 107, generating a new scanning line.

For example, as shown in FIG. 3, assuming that the scanning line of a video data of one line outputted from the first line memory unit 102 is "C" and the scanning line of a video data of one line outputted from the second line memory unit 103 is "B", and if the coefficient value K outputted from the coefficient input terminal 106 is 1, the first multiplier 104 multiplies the video data C outputted from the first line memory unit 102 by "1–k=0" and then the output of zero (0) is obtained. The second multiplier 105 multiplies the video data B outputted from the second line memory unit 103 by "k–1", so that the scanning line B of the video data B is directly outputted and inputted into the sum unit 107.

The sum unit 107 adds scanning lines of two video data outputted from the first and second multipliers 104 and 105 and outputs a scanning line b of new video data through the output terminal 108.

In the same manner, scanning lines b, c1, c2 and d1 of four video data are generated using three scanning lines B, C, and D of an input video data.

Next, although one horizontal cycle lapses, an output of the field memory unit 101 is not present.

Referring to FIG. 4, to generate four scanning lines using three scanning lines, the scanning line B of a video data of the second line memory unit 103 is repeated, the scanning line C of a video data of the first line memory unit 102 is repeated, and the output of the field memory unit 101 is indicated as zero (0) so that the first line memory unit 102 does not receive any signal.

However, when the coefficient value K of ¼ is inputted to the second multiplier 105 and the coefficient value 1−k of ¾ is inputted to the first multiplier 104, the first multiplier 104 outputs to the sum unit 107 a predetermined value obtained by multiplying the scanning line C of the video data outputted from the first line memory unit 102 by an input coefficient value of ¾, and the second multiplier 105 multiplies the scanning line B of the video data outputted from the second line memory unit 103 by a coefficient value of ¼ and then outputs the multiplication results to the sum unit 107.

Therefore, the sum unit 107 sums scanning lines of two video data obtained by the fist and second multipliers 104 and 105, generates a scanning line C1 of a new video data, and outputs the generated scanning line C1 through the output terminal 108.

During the next horizontal cycle, when the coefficient K outputted from the coefficient input terminal 106 is changed to ½ and the coefficient value 1−k is changed to ½, the first multiplier 104 multiplies the scanning line D of a video data outputted from the first line memory unit 102 by an input coefficient value of ½ and then outputs the result to the sum unit 107. The second multiplier 105 multiplies the scanning line C of a video data outputted from the second line memory unit 103 by a coefficient value of ½ and then outputs the result to the sum unit 107.

The sum unit 107 sums the scanning lines of two video data outputted from the first and second multipliers 104 and 105 and generates a scanning line C2 of a new video data, which is output through the output terminal 108.

The coefficient values outputted through the coefficient input terminal 106 are k=1, ¼, ½, ¾, 1, . . . , and 1−k=0, ¾, ½, ¼, 0, . . . .

In addition, since the sum of the coefficients k and 1−k which are multiplied by the output signals of the first and second line memory units 102 and 103 is 1 (one), there is no change of the video signal.

As described above, a signal corresponding to as much as ¾ of the vertical region of a 4:3 video signal shown in FIG. 2A is displayed on the entire vertical portion of a 16:9 wide screen by converting three scanning lines into four scanning lines.

However, such a conventional scanning line conversion unit of a 16:9 wide screen television has disadvantages in that it is impossible to obtain a double picture function which needs the entire region of a screen, since a corresponding region is stored in a field memory in a zoom mode and zoomed. In addition, since signal processing is performed at the field memory, it is impossible to perform a freeze function.

SUMMARY OF THE INVENTION

Accordingly, it is an object of the present invention to provide an apparatus for converting a screen aspect ratio which overcomes the problems encountered in a conventional screen aspect ratio conversion apparatus.

It is another object of the present invention to provide an improved apparatus for converting a screen aspect ratio which is capable of displaying a 4:3 broadcast signal on a screen having an aspect ratio of 16:9 by expanding the screen aspect ratio to 4:3 in an interpolation unit and by removing a portion exceeding a range of the screen aspect ratio of 16:9.

It is still another object of the present invention to provide an apparatus for converting a screen aspect ratio which is capable of converting a given screen aspect ratio into a screen aspect ratio of 4:3 using a pixel compression method in a wide screen television having a screen aspect ratio of 16:9.

It is still another object of the present invention to provide an apparatus for converting a screen aspect ratio which is capable of performing a still and double picture function in accordance with a judgement method of a video signal stored in a field memory by allowing a zoom function and a horizontal compression function using a line interpolation method and a pixel compression method and by processing a signal before a field memory.

To achieve the above and other objects, in accordance with an embodiment of the present invention, there is provided an apparatus for converting a screen aspect ratio, which includes a scanning line processing unit for generating a write/read signal and first and second selection control signals in accordance with a horizontal synchronous signal inputted thereto; a data storing unit for alternatively storing digital video data with respect to three lines outputted in accordance with a first selection control signal and a write/read signal generated by the scanning line processing unit; a line interpolation unit for multiplying video data with respect to the current and next three lines outputted from the data storing unit by coefficient values; a line selection unit for sequentially selecting at every line a video data interpolated by the line interpolation unit in accordance with a second selection control signal of the scanning line processing unit and a video data obtained by the data storing unit, and for outputting a different value; a sum unit for summing two different video data obtained by the line selection unit; a horizontal synchronous count unit for counting a start portion of a horizontal synchronous signal to be zoomed and for generating a write enable signal when the horizontal synchronous signal reaches a zooming region; and a field memory unit for storing by field a video data which is zoomed by 3:4 by the data sum unit in accordance with a write enable signal of the horizontal synchronous count unit.

To achieve the above and other objects, in accordance with another embodiment of the present invention, there is provided an apparatus for converting a screen aspect ratio, which includes a pixel compression control unit for generating first through fourth selection control signals and a writing enable signal in accordance with a horizontal synchronous signal inputted thereto for horizontal compression; a first data storing unit for alternatively storing at every pixel a video data inputted thereto in accordance with a fourth selection control signal outputted from the pixel compression control unit; a pixel compression unit for combining video data outputted from the first data storing unit into three pixels by combining it at every fourth pixel and for selectively outputting the same in accordance with a second selection control signal of the pixel compression unit; a second data storing unit for alternately storing a pixel obtained by the pixel compression unit in accordance with the write enable signal of the pixel compression control unit; a side panel inserting unit for inserting a luminance level value of a side panel, which is previously set in accordance with a detection of an average pixel level or an average beam current level, into a pixel data alternately inputted thereto from the second data storing unit in accordance with the third and fourth selection control signals of the pixel compression control unit; and a field memory unit for storing at every field a video signal into which a side panel signal is inserted by the side panel inserting unit and for outputting a horizontally compressed digital video signal.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 7A is a diagram of a write/read order and a coefficient variation order of a first FIFO (first-in-first-out) unit of FIG. 5 according to the embodiments of the present invention;

FIG. 7B is a diagram of a write/read order and a coefficient variation order of a second FIFO of FIG. 5 according to the embodiments of the present invention;

FIGS. 8A and 8B are diagrams of a screen variation state of FIGS. 5 and 6 according to the present invention;

FIG. 9 is a block diagram of a 4:3 pixel compression processing unit of a screen aspect ratio conversion apparatus according to another embodiment of the present invention;

FIGS. 11A through 11C are diagrams of a variation state of a video signal obtained by a horizontal compression processing of FIG. 9 according to the embodiments of the present invention; and FIGS. 12A and 12B are diagrams of a screen variation state of FIGS. 9 and 10 according to the embodiments of the present invention.

DETAILED DESCRIPTION OF THE PREFERRED EMBODIMENTS

Figure 1:
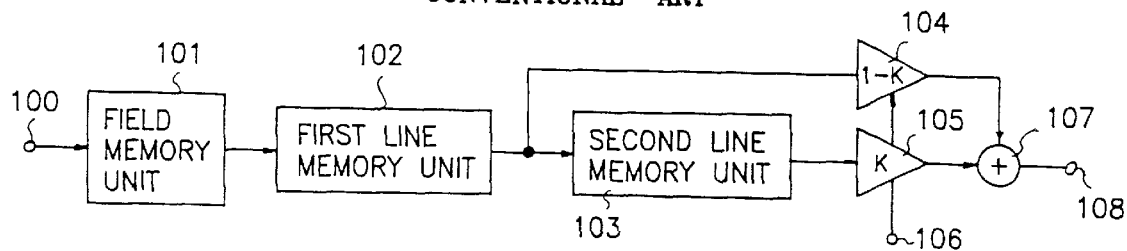
FIG. 1 is a schematic block diagram of the construction of a conventional scanning number conversion apparatus of a wide screen television having a screen aspect ratio of 16:9.
Figure 2A:
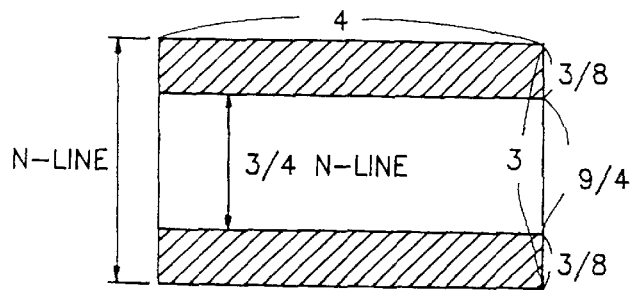
FIGS. 2A and 2B are diagrams showing a 4:3 aspect ratio broadcast signal of FIG. 1 to be displayed in a screen having an aspect ratio of 16:9 in a zoom mode.
Figure 2B:
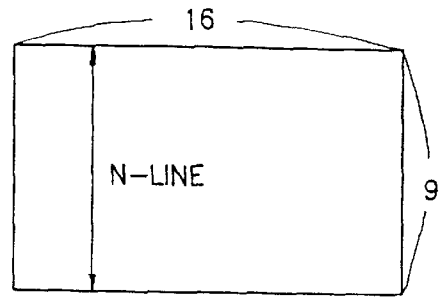
Figure 3:
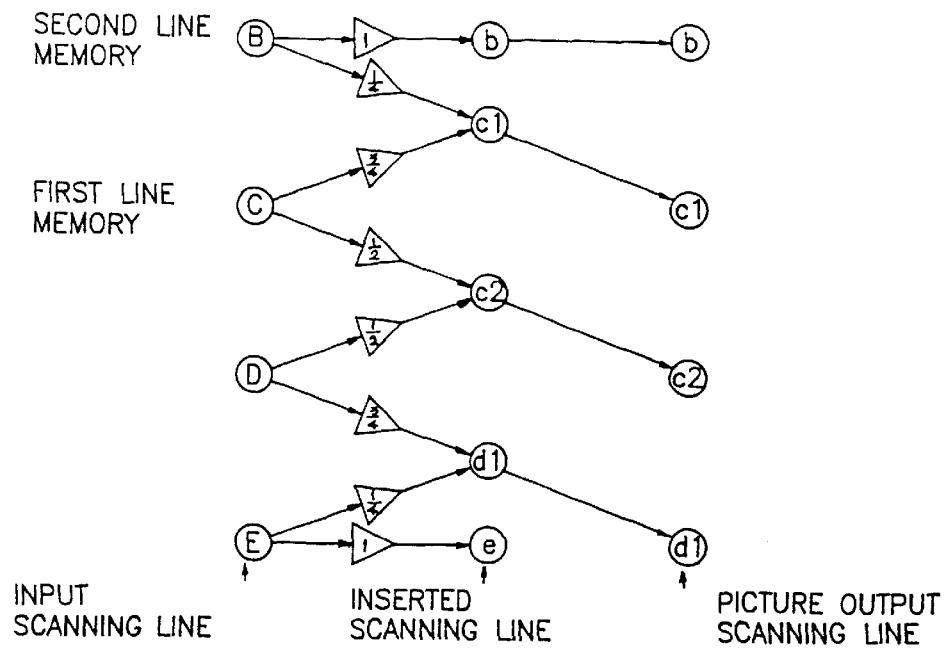
FIG. 3 is a diagram of a scanning line input/output relationship of FIG. 1.
Figure 4:
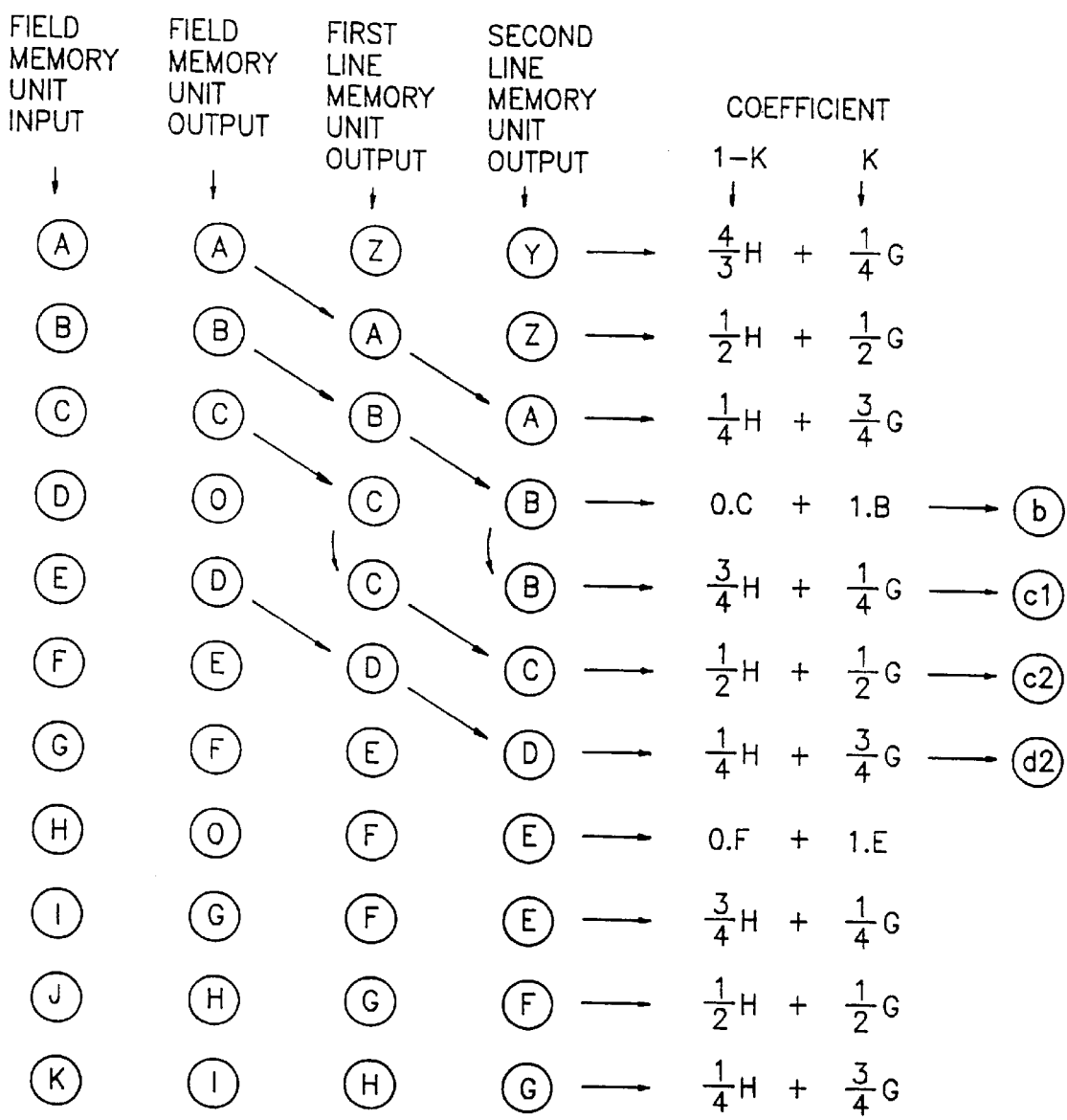
FIG. 4 is a diagram of the enlarged state of the scanning lines FIG. 1.
Figure 5:
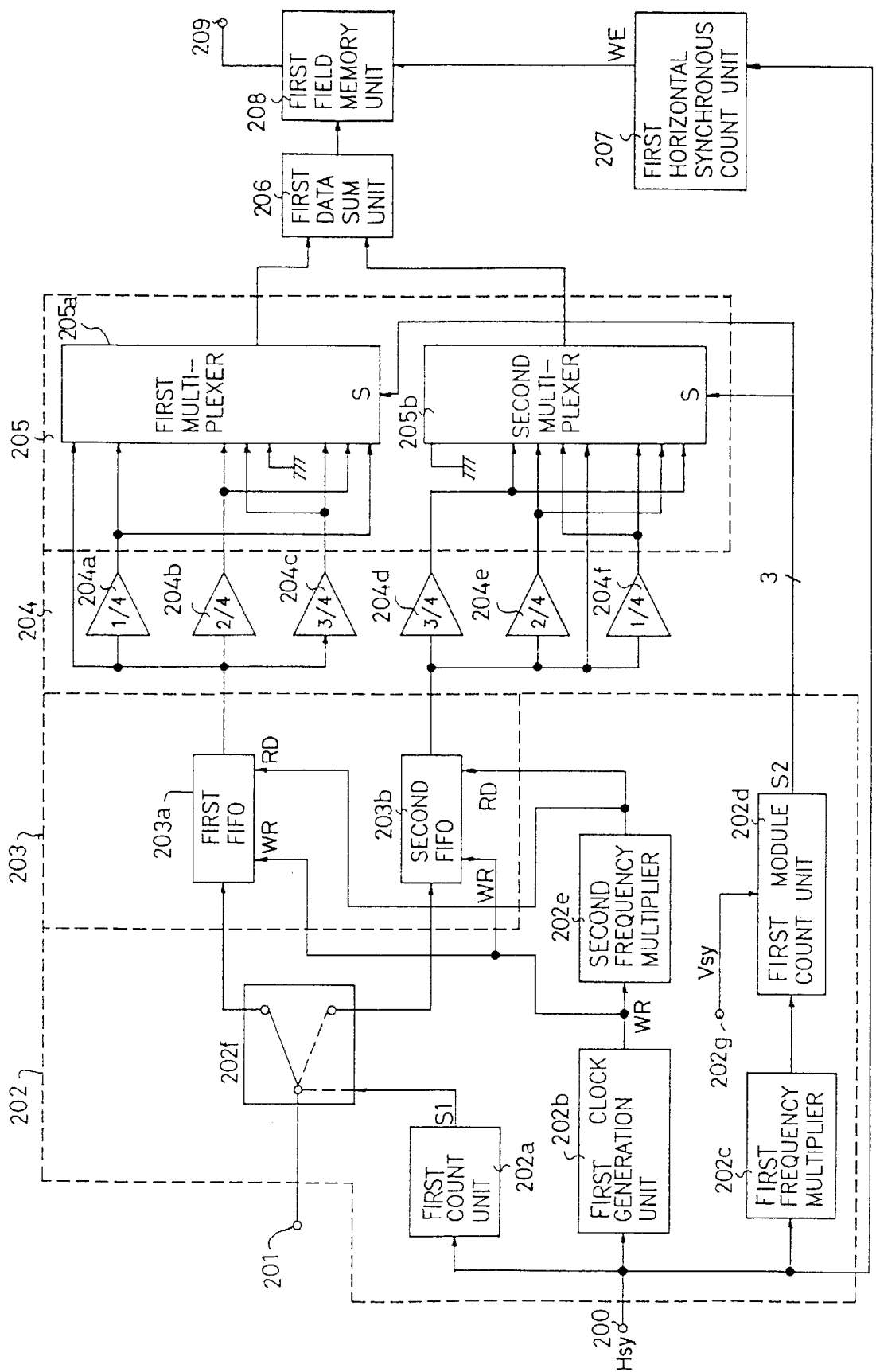
FIG. 5 is a block diagram of a 3:4 line interpolation processing unit of a screen aspect ratio conversion apparatus according to an embodiment of the present invention.

Referring to FIG. 5, a 3:4 line interpolation processing unit of a screen aspect ratio conversion apparatus according to an embodiment of the present invention includes a first scanning line processing unit 202 for generating a write and read signal WR/RD and first and second selection control signals S1 and S2 in accordance with a synchronous signal Hsy outputted from a synchronous input terminal 200 to convert three horizontal scanning lines into four lines, a first data storing unit 203 for alternately inputting digital video data outputted from the video input terminal 201 in accordance with the first selection control signal S1 and the write/read signal WR/RD into a first FIFO 203a and a second FIFO 203b which are line memories, a first interpolation unit 204 for multiplying two lines of video data outputted from the first and second FIFOs 203a and 203b of the first data storing unit 203 by different coefficient values, a first line selection unit 205 for sequentially selecting video data interpolated by the first line interpolation unit 204 in accordance with the second selection control signal S2 of three bits generated by the first scanning line processing unit 202, and video data directly outputted from the first data storing unit 203 at every line and for a different value, a first data sum unit 206 for summing the video data selected by the first line selection unit 205, a first horizontal synchronous count unit 207 for counting a start portion of a horizontal synchronous signal Hsy which is to be zoomed and for generating a write enable signal WE when the horizontal synchronous signal Hsy reaches a zooming region, and a first field memory unit 208 for storing at every field a video data which is zoomed to a 3:4 video data outputted from the first data sum unit 206 in accordance with a write enable signal WE generated by the first horizontal synchronous count unit 207 and for outputting the video data through the output terminal 209.

The first scanning line processing unit 202 includes a first clock generating unit 202b for generating a write signal WR whenever a horizontal synchronous signal Hsy is inputted through the input terminal 200 and for outputting the write signal WR to the first and second FIFOs 203a and 203b of the first data storing unit 203, a second frequency multiplier 202e for multiplying the write signal WR generated by the first clock generating unit 202b by 4/3, generating a read signal RD, and outputting the read signal RD to the first and second FIFOs 203a and 203b, a first frequency multiplier 202c for multiplying the horizontal synchronous signal Hsy inputted thereto through the synchronous input terminal 200 by 4/3, a first module count unit 202d for counting a horizontal synchronous signal multiplied by the first frequency multiplier 202c, generating a second selection control signal S2 of three bits, and clearing the second selection control signal S2 when a vertical synchronous signal Vsy is inputted thereto through the synchronous input terminal 202g, a first count unit 202a for dividing the horizontal synchronous signal Hsy input through the synchronous input terminal 200 into two parts and generating a first selection control signal S1, and a first switching unit 202f for alternatively directing the digital video data input through the video input terminal 201 in accordance with the first selection control signal S1 from the first count unit 202a, to the first and second FIFOs 203a and 203b of the first data storing unit 203.

The first line interpolation unit 204 includes a first multiplier 204a for multiplying video data outputted from the first FIFO 203a by ¼, a second multiplier 204b for multiplying video data outputted from the first FIFO 203a by ⅔, a third multiplier 204c for multiplying video data outputted from the first FIFO 203a by ¾, and fourth through sixth multipliers 204d through 204f for multiplying video data outputted from the second FIFO 204 by ¾, ⅔, and ¼, respectively.

The first line selection unit 205 includes a first multiplexer 205a for sequentially selecting one of video data of 1 bit from the first FIFO 203a of the first data storing unit 203 in accordance with the second selection control signal S2 of three bits generated by the first module count unit 202d, two-bit video data inputted thereto from the first line interpolation unit 204 and the first through third multipliers 204a through 204c, and a ground electric potential. The first line selection unit 205 further includes a second multiplexer 205b for sequentially selecting one of video data of 1 bit from the second FIFO 203b in accordance with the three-bit second selection control signal S2 generated by the first module count unit 202d, two-bit video data inputted from the fourth through sixth multipliers 204d–204f of the first line interpolation unit 204, and a ground electric potential. The outputs of the first and second multiplexers 205a and 205b are directed to the first data sum unit 206.

Figure 6:
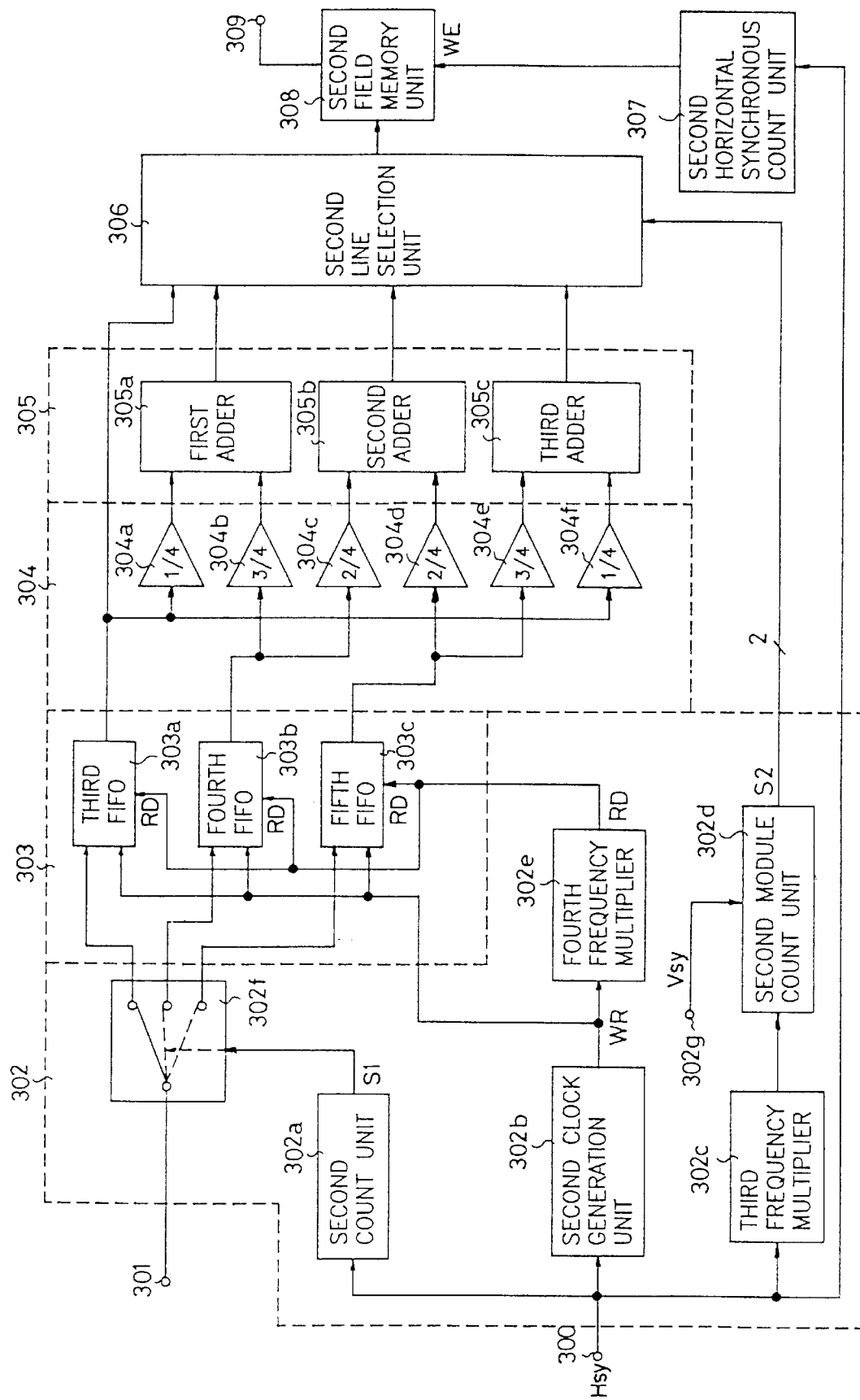
FIG. 6 is a block diagram of a 3:4 line interpolation processing unit of a screen aspect ratio conversion apparatus according to another embodiment of the present invention.

As shown in FIG. 6, a 3:4 line interpolation of a video signal of a screen aspect ratio conversion apparatus according to a second embodiment of the present invention includes a second scanning line processing unit 302 for generating write and read signals WR and RD and first and second selection control signal S1 and S2 in accordance with a horizontal synchronous signal Hsy input through the synchronous input terminal 300 for converting three horizontal scanning lines to four lines, a second data storing unit 303 for selectively storing digital data inputted through a video input terminal 301 in accordance with the first selection control signal S1 and the write/read signal WR/RD in the third through fifth FIFOs 303a–303c at every line and for dividing the three lines of video data into two lines, a second line interpolation unit 304 for multiplying the two lines of video data outputted from the second data storing unit 303 and the third through fifth FIFOs 303a–303c by different coefficient values, a second data sum unit 304 for summing two sets of video data interpolated by the second line interpolation unit 304 and for outputting video data of three lines, a second line selection unit 306 for sequentially selecting at every line the three lines of video data outputted from the second data sum unit 305 in accordance with the two-bit second selection control signal S2 and the one line of video data of the third FIFO 303a, a second horizontal synchronous count unit 307 for counting the number of horizontal synchronous signals Hsy and generating a write enable signal WE when a start portion of the horizontal synchronous signal Hsy to be zoomed reaches a range of the horizontal synchronous signal Hsy, and a second field memory unit 308 for storing at every field video data, which is zoomed by 3:4 and outputted from the second line selection unit 306 in accordance with the write enable signal WE and for outputting the stored video data through an output terminal 309.

The second scanning line processing unit 302 includes a second clock generating unit 302b for generating a write signal WR whenever a horizontal synchronous signal Hsy is inputted through the synchronous input terminal 300 and for outputting the write signal WR to the third through fifth FIFOs 303a–303c, a fourth frequency multiplier 302e for generating a read signal RD by multiplying the write signal WR outputted from the second clock generating unit 302b by 4/3 and for outputting the multiplied signal to the third through fifth FIFOs 303a–303c , a third frequency multiplier 302c for multiplying a horizontal synchronous signal Hsy outputted from the synchronous input terminal 300 by 4/3, a second module count unit 302d for generating a two-bit second selection control signal S2 by counting a horizontal synchronous signal multiplied by the third frequency multiplier 302c and for clearing the second selection control signal S2 when a vertical synchronous signal Vsy is inputted through the synchronous input terminal 302g, a second count unit 302a for counting the number of horizontal synchronous signals Hsy inputted thereto through the synchronous input terminal 300 and for generating a first selection control signal S1 having zero (0) to two (2) digits, and a second switching unit 302f for selectively outputting digital video data inputted thereto through the video input terminal 301 in accordance with the first selection control signal S1 outputted from the second count unit 302a to the third through fifth FIFOs 303a–303c.

The second line interpolation unit 304 includes seventh through twelfth multipliers 304a–304f for multiplying video data from the third to fifth FIFOs 303a–303c by respective coefficients. The video data from the third FIFO 303a of the second data storing unit 303 is multiplied by ¼ in the seventh and twelfth multipliers 304a and 304f, eighth and ninth multipliers 304b and 304c are used to multiply video data outputted from the fourth FIFO 303b by ¾ and ²⁄₄, respectively, and tenth and eleventh multipliers 304d and 304e are used to multiply video data outputted from the fifth FIFO 303c by ²⁄₄, and ¾, respectively.

The second data sum unit 305 includes a first adder 305a for adding video data output by the seventh and eighth multipliers 304a and 304b, a second adder 305b for adding video data output by the ninth and tenth multipliers 304c and 304d, and a third adder 305c for adding video data output by the eleventh and twelfth multipliers 304e and 304f.

The operation of the 3:4 line interpolation processing unit for a video signal in a screen aspect ratio conversion unit according to an embodiment of the present invention will now be explained with reference to FIGS. 5, 7, and 8.

The 3:4 line interpolation refers to a method of converting three lines of a horizontal scanning line to four lines. When a horizontal synchronous signal Hsy is inputted through the synchronous input terminal 200, the first scanning line processing unit 202 performs a frequency multiplication, dividing and counting operation on the inputted horizontal synchronous signal Hsy so as to change three lines of the horizontal scanning line to four lines, and outputs a write signal WR, a read signal RD, and two pairs of different first and second selection control signals S1 an S2.

That is, the first clock generating unit 202b generates a write signal WR whenever a horizontal synchronous signal Hsy is inputted through the synchronous input terminal 200 and then outputs the write signal WR to the first and second FIFOs 203a and 203b of the first data storing unit 203. The second frequency multiplier 202e multiplies the write signal WR generated by the first clock generating unit 202b by 4/3 and then outputs a read signal RD to the first and second FIFOs 203a and 203b.

In addition, the first frequency multiplier 202c multiplies the horizontal synchronous signal Hsy outputted from the synchronous input terminal 200 by 4/3 at every line and then outputs the multiplied signal to the first module count unit 202d. The first module count unit 202d generates a three-bit second selection control signal S2 formed of digits 0 through 7 at every eighth line to change the horizontal synchronous signal multiplied by 4/3 to the selection control signal S2 at every line. The first module count unit 202d is cleared at every field by a vertical synchronous signal Vsy inputted through the synchronous input terminal 202g.

Meanwhile, the first count unit 202a of the first scanning line processing unit 202 divides the inputted horizontal synchronous signal Hsy into ½, and then outputs the first selection control signal S1 to the first switching unit 202f.

At this time, when digital video data is inputted through the video input terminal 201, the first switching unit 202f is switched at every line in accordance with the first selection control signal Sl of the first count unit 202a and alternatively outputs inputted digital video data to the first and second FIFOs 203a and 203b of the first data storing unit 203.

The first and second FIFOs 203a and 203b of the first data storing unit 203 alternatively store video data inputted through the first switching unit 202f in accordance with the write signal WR inputted from the first clock generating unit 202b.

For example, the first three lines of data are sequentially stored into the first FIFO 203a, the second FIFO 203b, and the first FIFO 203a, respectively. However, the next three lines of data are sequentially stored into the second FIFO 203b, the first FIFO 203a, and the second FIFO 203b, respectively.

Referring to FIGS. 7A and 7B, video data with respect to the first three lines are assumed to be A, B, and C, respectively, and the video data with respect to the next three lines are assumed to be D, E, and F, respectively. The video data A for the first line among the first three lines is stored in the first FIFO 203a in accordance with the first selection control signal S1 and write signal WR, the video data B for the second line is stored in the second FIFO 203b, and the video data C for the third line is stored in the first FIFO 203a of the first data storing unit.

In addition, the video data D for the first line of the next three lines is stored in the second FIFO 203b in accordance with the first selection control signal S1 and write signal WR, the video data E for the second line is stored in the first FIFO 203a, and the video data F for the third line is stored in the second FIFO 203b.

The video data for the six lines stored in the first and second FIFOs 203a and 203b which are line memories, are read as shown in FIGS. 7A and 7B in accordance with the read signal RD which is 4/3 times the write signal WR outputted from the second frequency multiplier 202e. The multiplied results are outputted to the first line interpolation unit 204.

That is, when video data is stored in either the first or second FIFO 203a or 203b in accordance with the first clock generating unit 202b, and the video data written in the FIFO is read as AA, BB, CC, DD, and FF as shown in FIGS. 7A and 7B in accordance with the read signal RD which is 4/3 times the write signal WR outputted from the second frequency multiplier 202e, the three horizontal scanning lines are converted to four horizontal scanning lines.

The first line interpolation unit 204 multiplies the video data for the current and next three lines outputted from the first and second FIFOs 203a and 203b by coefficient values K and 1−K so as to change three lines to four lines. Here, the coefficient values are K=1, ¼, ⅔, ¾ and 1−k=0, ¾, ½, ¼.

Therefore, as shown in FIG. 7A the first through third multipliers 204a–204c of the first line interpolation unit 204 are used to multiply the video data A, C, E, A . . . read at every line from the first FIFO 203a of the first data storing unit 203 by ¼, ⅔, and ¾ and to output the results to the first multiplexer 205a. As shown in FIG. 7B, the fourth through sixth multipliers 204d–204f are used to multiply the video data B, D, F, B, . . . read at every line from the second FIFO 203b by coefficient values (1−K) of ¾, ⅔, ¼.

The first multiplexer 205a of the first line selection unit 205 selectively outputs at every line a video data of the first FIFO 203a, a video data multiplied by the first through third multipliers 204a–204c, and the ground electric potential in accordance with the three-bit second selection control signal S2 outputted from the first module count unit 202d of the first scanning line processing unit 202. The second multiplexer 205b selectively reads video data of the second FIFO 203b, video data multiplied by the fourth through sixth multipliers 204d–204f, and the ground electric potential, and outputs the video data to the first data sum unit 206.

That is, as shown in FIGS. 7A and 7B, when the three-bit second selection control signal S2 output from the first module count unit 202d with respect to the first three lines is inputted in the form of "000", the first multiplexer 205a, as shown in FIG. 7A, selects video data A outputted from the first FIFO 203a and outputs the same to the first data sum unit 206. The second multiplexer 205b, as shown in FIG. 7B, selects the ground electric potential (i.e., zero values) and outputs the same to the first data sum unit 206.

When the second selection control signal S2 is inputted in the form of "001", the first multiplexer 205a selects video data A which is multiplied by ¼ by the first multiplier 204a, and the second multiplexer 205b selects video data B which is multiplied by ¾ by the fourth multiplier 204d. When the second selection control signal S2 is inputted in the form of "010", the first multiplexer 205a selects video data C which is multiplied by ⅔ by the second multiplier 204b, and the second multiplexer 205b selects video data B which is multiplied by ⅔ by the fifth multiplier 204e. When the second selection control signal S2 is inputted in the form of "011", the first multiplexer 205a selects video data C which is multiplied by ¾ by the third multiplier 204c, and the second multiplexer 205b selects the video data D which is multiplied by ¼ by the sixth multiplier 204f.

In the same manner as described above, when the three-bit second selection control signal S2 outputted from the first module count unit 202d is sequentially inputted in the form of "100", "101", "110", and "111", the first multiplexer 205a selects at every line the ground potential, video data E which is multiplied by ¾, video data E which is multiplied by ⅔, and video data A which is multiplied by ¼. The second multiplexer 205b selects at every line the original video data D of the second FIFO 203b, video data which is multiplied by ¼, video data F multiplied by ⅔, and video data F which is multiplied by ¾, and then outputs the same to the data sum unit 206.

That is, the coefficient multiplied with a video signal outputted from the first FIFO 203a becomes four coefficients of K within the region of the first three horizontal lines, and then four coefficients of 1−k are multiplied after the region of the next three horizontal lines. On the contrary, the coefficient which is multiplied with the video signal outputted from the second FIFO 203b becomes four coefficients of 1−k at the first three horizontal lines, and four coefficients of K after the region of the next three horizontal lines.

The video data selected by the first and second multiplexers 205a and 205b of the first line selection unit 205 are summed by the first data sum unit 206, and the sum of two coefficients which are multiplied at every signal line is always one (1).

The video data summed at every line by the first data sum unit 206 is inputted to the first field memory unit 208. At this time, the first horizontal synchronous count unit 207 counts the number of horizontal synchronous signals Hsy inputted through the synchronous input terminal 200 to count the start portion of the horizontal scanning line to be zoomed. The first horizontal synchronous count unit 207 outputs a write enable signal WE to the first field memory unit 208 when the horizontal scanning line reaches a zooming region.

The first field memory unit 208 becomes active when a write enable signal WE is inputted from the first horizontal synchronous count unit 208, reads and writes the video data which is zoomed by 3:4 by the first data sum unit 206, and outputs the zoomed digital video data through the output terminal 209.

Meanwhile, the operation of a 3:4 line interpolation processing unit of a screen aspect ratio conversion apparatus according to another embodiment of the present invention will now be explained with reference to the accompanying drawings.

This embodiment is directed to using the identical three line memories and referred to as a method of alternately writing video data into three FIFOs (third through fifth FIFOs) 303a–303c at every third line, using the third through fifth FIFOs 303a–303c and multiplying and combining four lines using a predetermined coefficient as shown in FIG. 6.

The above-described operation will now be described in more detail. When the horizontal synchronous signal Hsy is inputted through the synchronous input terminal 300, the second clock generating unit 302b of the second scanning line processing unit 302 generates a write signal WR whenever a horizontal synchronous signal Hsy is inputted, and then outputs the write signal WR to the third through fifth FIFOs 303a–303c of the second data storing unit 303 and to the fourth frequency multiplier 302e. The fourth frequency multiplier 302e multiplies the inputted write signal WR by 4/3, and then outputs the result to the third through fifth FIFOs 303a–303c as a read signal RD.

In addition, the horizontal synchronous signal Hsy inputted through the synchronous input terminal 300 is multiplied by 4/3 by the third frequency multiplier 302c of the second scanning line processing unit 302. The multiplied signal is cleared by the vertical synchronous signal Vsy inputted at every field through the synchronous input terminal 302g, and then is inputted to the second line selection unit 306 as a second selection control signal S2 of two bits.

Meanwhile, the second count unit 302a of the second scanning line processing unit 302 counts at every line the number of horizontal synchronous signals Hsy input thereto, and outputs the result to the second switching unit 302f as a first selection control signal S1 having zero (0) to two (2) digits.

At this time, when the digital vide data is inputted to the second switching unit 302f through the video input terminal 301, the second switching unit 302f is switched in accordance with the first selection control signal S1, and alternately outputs at every third line the inputted digital video data to the third through fifth FIFOs 303a–303c of the second data storing unit 303.

The third through fifth FIFOs 303a–303c write video data outputted from the second switching unit 302f whenever a write signal WR is inputted thereto from the second clock generating unit 302b. The written video data is read in accordance with a read signal RD, which is 4/3 times the write signal WR, outputted from the fourth frequency multiplier 302e, and then inputted to the seventh through twelfth multipliers 304a–304f of the second line interpolation unit 304 and the second line selection unit 306.

The seventh and twelfth multipliers 304a and 304f multiply the video data outputted from the third FIFO 303a by ¼, and then input the result to the first and third adders 305a and 305c of the second data sum unit 305. The eighth and ninth multipliers 304b and 304c multiply the video data outputted from the fourth FIFO 303b by ¾ and ⅔, respectively, and then output the result to the second and third adders 305b and 305c.

The first adder 305a of the second data sum unit 305 adds the video data which are multiplied by ¼ and ¾ by the seventh and eighth multipliers 304a and 304b, the second adder 305b adds the video data which are multiplied by ⅔ by the ninth and tenth multipliers 304c and 304d, respectively, and the third adder 305c adds the video data which are multiplied by ¾ and ¼ by the eleventh and twelfth multipliers 304e and 304f.

The video data outputted from the first through third adders 305a–305c are inputted to the second line selection unit 306.

The second line selection unit 306 selects one of the video data of the third FIFO 303a, the video data output by the first adder 305a, the video data output by the second adder 305b, and the video data output by the third adder 305c, in accordance with the two-bit second selection control signal S2. The selected video data is output to the second field memory unit 308.

That is, when the second selection control signal S2 is inputted in the form of "00", the second line selection unit 306 selects the original data outputted from the third FIFO 303a, and then outputs the same to the second field memory unit 308. When the second selection control signal S2 is inputted in the form of "01", the video data which is added by the first adder 305a is selected and then outputted to the second field memory unit 308. When the second selection control signal S2 is inputted in the form of "10", the video data of the second adder 305b is selected and then outputted to the second field memory unit 308. When the second selection control signal S2 is inputted in the form of "11", the video data of the third adder 305c is selected and then outputted to the second field memory unit 308.

The second field memory unit 308 receives a write enable signal WE from the second horizontal synchronous count unit 307 which has the same operation as the first horizontal synchronous count unit shown in FIG. 5, writes video data which is zoomed by 3:4 by the second line selection unit 3–6, and outputs the zoomed digital video data through the output terminal 309.

Thereafter, when the video data which is zoomed by 3:4 is displayed on a screen, the screen is expanded to have a screen aspect ratio of 4:3, and the encircled region by a dotted line which exceeds a range of the screen aspect ratio of 16:9 is removed.

FIG. 8A shows a state where the video signal of 4:3 is displayed on a screen having an aspect ratio of 16:9 without changes of the aspect ratio.

Referring the FIG. 9, a 4:3 pixel compressing processing unit of a screen aspect ratio conversion apparatus according to an embodiment of the present invention, includes a pixel compression control unit 402 for generating first through fourth selection control signals S1–S4 and a write enable signal WE in accordance with a horizontal synchronous signal Hsy inputted thereto through a synchronous input terminal 400 for a horizontal compression, a third data storing unit 403 for alternately storing video data inputted through a video input terminal 401 in accordance with the first selection control signal S1 and the fourth selection control signal S4 outputted from the pixel compression control unit 402 at every pixel, in first and second flip-flips 403a and 403b, a pixel compression unit 404 for combining the video data outputted from the third data storing unit 403 at every fourth pixel to three pixels and for switching at every line in accordance with the second and third selection control signals S2 and S3, a fourth data storing unit 405 for alternately storing pixel data selected and outputted at every line from the pixel compression unit 404, into sixth and seventh FIFOs 405a and 405b in accordance with a write enable signal WE of the pixel compression control unit 402, a ROM 409 for generating a two-bit luminance level selection control signal LS in accordance with an average picture level or an average beam current level outputted from the input terminal 408, a luminance level selection unit 410 for selecting one of the luminance level values D1–D4 of a side panel in accordance with the two-bit luminance level selection control signal LS outputted from the ROM 409, a side panel insertion union 406 for inserting luminance level values D1–D4 of a side panel selected by the luminance level selection unit 410 into pixel data which are alternately outputted from the fourth data storing unit 405 in accordance with the third and fourth selection control signals S3 and S4 of the pixel compression control unit 403, and a third field memory unit 407 for storing at every field video data with the luminance level value of the side panel inserted therein and for outputting a horizontally compressed digital video signal to an output terminal 411.

The pixel compression control unit 402 includes a third clock generating unit 402a for generating a clock pulse whenever a horizontal synchronous signal Hsy is inputted through the synchronous input terminal 400, a third module count unit 402e for generating a two-bit second selection control signal S2 by counting the number of clock pulses generated by the third clock generating unit 402a and then outputting the result to the pixel compression unit 404, an OR-device 402f for ORing a two-bit second selection control signal S2 outputted from the third module count unit 402e and for generating a write enable signal WE, a clock count unit 402c for counting the number of clock pulses generated by the third clock generating unit 402a up to a previously set value and for generating a fourth selection control signal S4, a third count unit 402b for receiving the clock pulses generated by the third clock generating unit 402a and for outputting a first selection control signal S1 at every clock pulse, a third horizontal synchronous count unit 402d for counting at every line the horizontal synchronous signals Hsy outputted from the synchronous input terminal 400 and for outputting a third selection control signal S3, and a third switching unit 402g for alternately storing video data inputted thereto through the video input terminal 401 in accordance with the first and fourth selection control signals S1 and S4, into the first and second flip flops 403a and 403b of the third data storing unit 403 at every pixel.

The pixel compression unit 404 includes fourteenth and fifteenth multipliers 404b and 404c for multiplying pixels outputted from the first flip-flop 403a of the third data storing unit 403 by coefficient values of $\frac{1}{3}$ and $\frac{2}{3}$, respectively, thirteenth and sixteenth multipliers 404a and 404d for multiplying pixels outputted from the second flip-flop 403b of the third data storing unit 403 by coefficient values of $\frac{2}{3}$ and $\frac{1}{3}$, respectively, a fourth adder 404e for adding two pixel values obtained by the thirteenth and fourteenth multipliers 404a and 404b, a fifth adder 404f for adding two pixel values obtained by the fifteenth and sixteenth multipliers 404c and 404d, a third multiplexer for selecting at every fourth clock pulse the output of the fourth adder 404e, the output of the fifth adder 404f, the first pixel outputted from the first flip-flop 403a, or the ground electric potential, in accordance with the second selection control signal S2 of two bits, and a fourth switching unit 404h which is switched at every line in accordance with the third selection control signal S3 of the third horizontal synchronous count unit 402d with respect to a pixel selected by the third multiplexer 404g for writing into the sixth and seventh FIFOs 405a and 405b of the fourth data storing unit 405. In addition, the side panel inserting unit 406 includes a fifth switching unit 406a for switching at every line in accordance with the third selection control signal S3 generated by the third horizontal synchronous count unit 402d and for selecting a pixel outputted from the sixth and seventh FIFOs 405a and 405b, and a sixth switching unit 406b for switching in accordance with the fourth selection control signal S4 outputted from the clock count unit 402c, for mixing the pixel output from the fifth switching unit 406a and luminance level values D1–D4 of the luminance level selection unit 410, and for outputting the result to the third field memory unit 407.

Figure 10:
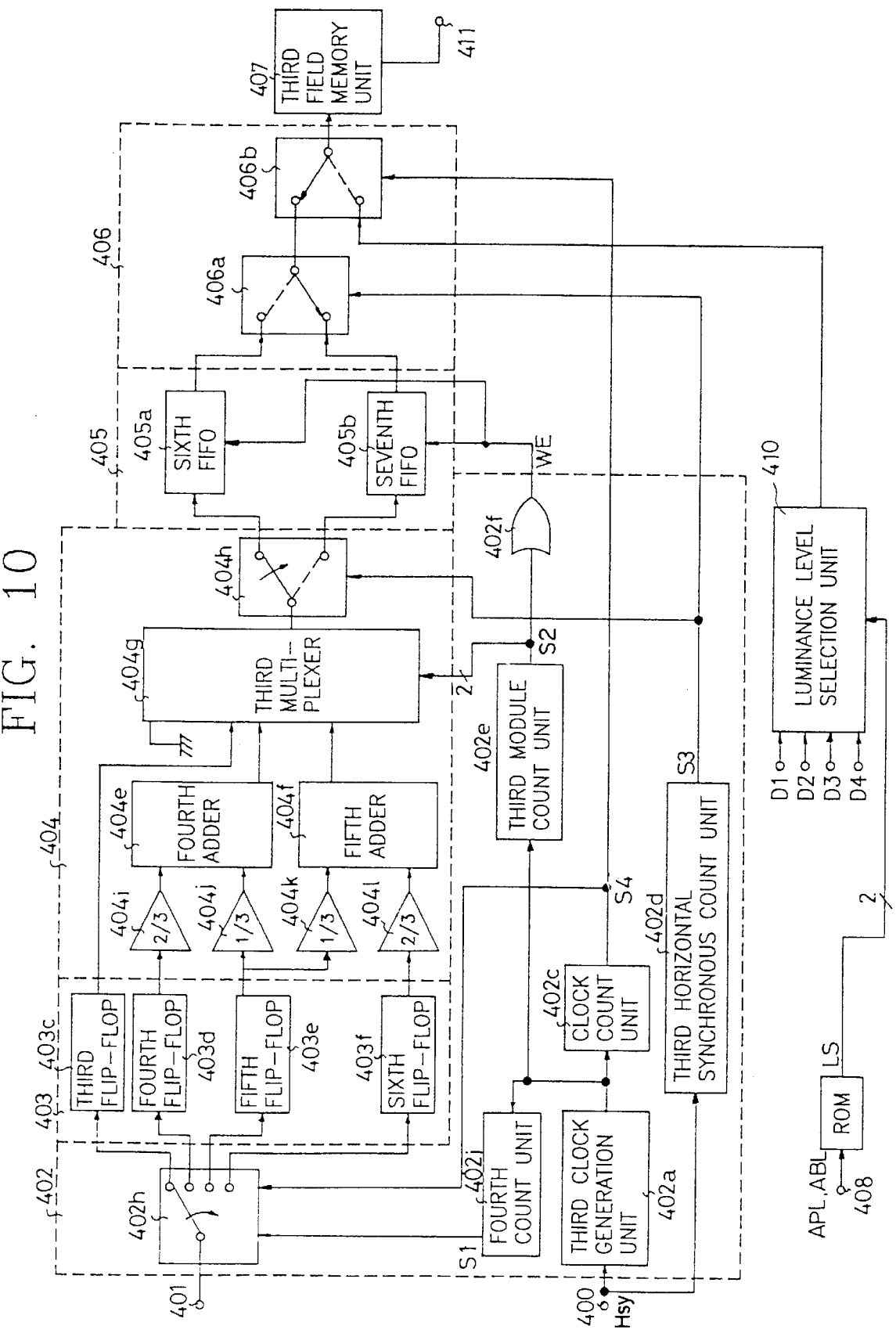
FIG. 10 is a block diagram of a 4:3 pixel compression processing unit of a screen aspect ratio conversion apparatus according to another embodiment of the present invention.

As shown in FIG. 10, a 4:3 pixel compression processing unit aspect ration conversion apparatus according to another embodiment of the present invention includes a fourth count unit 402i which is a module counter for counting the number of clock signals outputted from the third clock generating unit 402a and for generating a first selection control signal S1 of two bits, a seventh switching unit 402h for switching at every line digital video data outputted through a video input terminal 401 in accordance with the first selection control signal S1 and a fourth selection control signal S4 outputted from the clock counter unit 402c, third through sixth flip-flops 403c–403f for alternately storing video data inputted thereto at every line from the second switching unit 402h, a seventeenth multiplier 404i for multiplying a pixel outputted from the fourth flip-flop 403d by a coefficient value of $\frac{2}{3}$ and outputting the result to the fourth adder 404e, eighteenth and nineteenth multipliers 404j and 404k for multiplying a pixel outputted from the fifth flip-flop 403e by a coefficient value of $\frac{1}{3}$ and outputting the result to the fourth and fifth adders 404e and 404f, and a twentieth multiplier 404l for multiplying a pixel outputted from the sixth flip-flop 403f by a coefficient value of $\frac{2}{3}$ and outputting the result to the fifth adder 404f. The operation of a 4:3 pixel compression processing unit of a screen aspect ratio conversion apparatus according to the present invention will now be explained with reference to FIGS. 9, 11A–11C, 12A and 12B.

In this embodiment, a horizontal compression processing method is used to display a video signal in a normal mode using the sixth and seventh FIFOs 405a and 405b of the fourth data storing unit 405. That is, when a horizontal synchronous signal Hsy is inputted through the synchronous input terminal 400, the pixel compression control unit 402 generates first through fourth selection control signals S1–S4 and a write enable signal WE in accordance with a horizontal synchronous signal Hsy inputted thereto through the synchronous input terminal 400 to compress pixels.

That is, the third clock generating unit 402a generates a clock signal whenever the horizontal synchronous signal Hsy is inputted through the synchronous input terminal 400, and then outputs the clock signal to the third count unit 402b, the clock count unit 402c, and the third module count unit 402e.

The third count unit 402b changes the first selection control signal S1 into a high electric potential or low electric potential whenever a clock signal of the third clock generating unit 402a is generated and then outputs the control signal S1 to a selection terminal S of the third switching unit 402g. The clock count unit 402c counts the clock signals outputted from the third clock generating unit 402a, and then outputs the count result to a chip enable terminal CE of the third switching unit 402g.

The third module count unit 402e generates a two-bit second selection control signal S2 having digits from zero (0) to four (4) at every fourth line, to generate a selection control signal at every line with respect to a horizontal synchronous clock outputted from the third clock generating unit 402a, and outputs the second selection control signal S2 to the third multiplexer 404g and the OR device 402f.

The third horizontal synchronous count unit 402d counts at every line a start portion of the horizontal synchronous signal Hsy outputted from the synchronous input terminal 400, generates a third selection control signal S3, and outputs the third selection control signal 53 to the fourth switching unit 404h of the pixel compression unit 404 and the fifth switching unit 406a of the side panel inserting unit 406.

At this time, when digital video data as shown in FIG. 11A are inputted through the video input terminal 401, the third switching unit 402g is switched at every line in accordance with the first selection control signal S1 of the third count unit 402b and the fourth selection control signal S4 of the clock count unit 402c, and selectively stores the inputted digital video data into the first flip-flop 403a and the second flip-flop 403b of the third data storing unit 403 which are Dflip-flops.

As shown in FIG. 11A, since the video data in the real video region T should be compressed by ¾ as shown in FIG. 11B, the video data is alternately stored into the first flip-flop 403a and the second flip-flop 403b at every pixel during the video region T.

The pixels of video data stored in the first and second flip-flops 403a and 403b of the third data storing unit 403 are alternately outputted to the pixel compression unit 404.

The pixel compression unit 404 combines three pixels at every fourth pixel when pixels of the video data are alternately inputted thereto from the first and second flip-flops 403a and 403b. The pixels outputted from the first flip-flop 403a of the third data storing unit 403 are outputted to the fourteenth and fifteenth multipliers 404b and 404c of the pixel compression unit 404 and to the third multiplexer 404g. The pixels outputted from the second flip-flop 403b are inputted to the thirteenth and sixteenth multipliers 404a and 404d of the pixel compression unit 404.

The thirteenth multiplier 404a multiplies the second pixel outputted from the second flip-flop 403b by a coefficient value of ⅔ (or by ⅝ for making it simpler) and outputs the result to the fourth adder 404e. The fourteenth multiplier 404b multiplies the third pixel outputted from the first flip-flop 403 by a coefficient value of ⅓ (or by ⅜ for making it more simpler) and then outputs the result to the fourth adder 404e. The fifteenth multiplier 404c multiplies the third pixel outputted from the first flip-flop 403a by a coefficient value of ⅔ (or by ⅝ for making it simpler) and then outputs the result to the fifth adder 404f. The sixteenth multiplier 404d multiplies the fourth pixel outputted from the second flip-flop 403b by a coefficient value of ⅓ (or by ⅝ for making it simpler) and then outputs the result to the fifth adder 404f.

The fourth adder 404e adds the second pixel and the third pixel which are multiplied by the thirteenth and fourteenth multipliers 404a and 404b, and then outputs the results to the third multiplexer 404g. The fifth adder 404f adds the third pixel and the fourth pixel which are multiplied by the fifteenth and sixteenth multipliers 404c and 404d and then outputs the results to the third multiplexer 404g.

At this time, the third multiplexer 404g selectively outputs the first pixel directly outputted from the first flip-flop 403a, signals output from the fourth and fifth adders 404e and 404f, and the ground electric potential at every fourth clock, in accordance with the second selection control signal S2 of two bits. Since there are three pixels, for the first pixel interval, the ground electric potential (or zero signal) is selected.

When the two-bit second selection control signal S2 outputted from the third module count unit 402e has the form of "00", the third multiplexer 404g selects the ground electric potential (or zero signal) and outputs the signal to the sixth and seventh FIFOs 405a and 405b of the fourth data storing unit 405 through the fourth switching unit 404h which is switched at every line in accordance with a third selection control signal S3 of the third horizontal synchronous count unit 402d. At this time, since the second selection control signal S2 has the form of "00" and the output enable signal WE of the OR device 402f has the form of "0", the sixth and seventh FIFOs 405a and 405b are disabled and no signal is written.

When the second selection control signal S2 is inputted in the form of "01" to the third multiplexer 404g, the third multiplexer 404g selects the first pixel outputted from the first flip-flop 403a. When the second selection control signal S2 is inputted in the form of "10", the sum of the second pixel and the third pixel output from the fourth adder 404e is selected and outputted. Finally, when the second selection control signal S2 is inputted in the form of "11", the sum of the third pixel and the fourth pixel output from the fifth adder 404f is selected and outputted.

Since signals are combined at every fourth pixel by the pixel compression unit 404 and the three pixels are mixed, the real video region T as shown in FIG. 11A is compressed as much as ¾ times as shown in FIG. 11B.

Continuously, the combined signal selected by the third multiplexer 404g for three pixels is alternately written into the sixth and seventh FIFOs 405a and 405b at every line by the fourth switching unit 404h, and the previously written pixel is read and outputted to the fifth switching unit 406a of the side panel inserting unit 406 in the FIFO into which data is not written.

The fifth switching unit 406a of the side panel inserting unit 406 alternately selects pixels of the sixth and seventh FIFOs 405a and 405b at every line in accordance with a third selection control signal S3 of the third horizontal synchronous count 402d.

At this time, to display a video signal having a screen aspect ratio of 3:4 as shown in FIG. 12B on a screen having an aspect ratio of 16:9 as shown in FIG. 12A, the luminance level value of the side panel should be inserted into the left-side and right-side of the compressed video signal as shown in FIG. 11C.

Although the insertion of the luminance level value can have block levels, it is necessary to detect an average pixel level APL or an average beam current level ABL in accordance with a difference of luminance decay, the detected level is outputted to the ROM 409 through the input terminal 408.

Thereafter, the ROM 409 outputs a luminance level selection control signal LS of two bits to the luminance level selecting unit 410 in accordance with an average pixel level APL or an average beam current level ABL.

The luminance level selecting unit 410 selects a predetermined value among the previously set luminance level values D1–D4 in accordance with the inputted luminance level selection control signal LS of two bits, and then outputs the selected value to the sixth switching unit 406b of the side panel inserting unit 406.

In accordance with a fourth selection signal S4 outputted from the clock count unit 402c, the sixth switching unit 406a inserts a luminance level value into the left-side and right-side portions T1 and T2 of the video signal which is compressed to ¾ as shown in FIG. 11C, stores the adjusted video signal into the third field memory unit 407, and then outputs the horizontally compressed digital video signal through the output terminal 411.

The operation of a 4:3 pixel compression processing unit of a screen aspect ratio according to another embodiment of the present invention will now be explained with reference to the accompanying drawings.

The fourth count unit 402i of the pixel compression control unit 402 counts at every line the clock signals outputted from the third clock generating unit 402a, generates a first selection control signal S1 of two bits, and then outputs the control signal S2 to the selection terminal S of the seventh switching unit 402h.

The seventh switching unit 402h is switched at every line in accordance with the first selection control signal S1 of two bits outputted from the fourth count unit 402i and the fourth selection control signal S4 outputted from the clock count unit 402c, and selectively writes the digital video data inputted through the video input terminal 401 into the third through sixth flip-flops 403c–403f.

The pixels of video data written in the third flip-flop 403c are outputted directly to the third multiplexer 404g of the pixel compression unit 404, the pixels written in the fourth flip-flop 403d are outputted to the seventeenth multiplier 404i, and the pixels written in the fifth flip-flop 403e are outputted to the eighteenth and nineteenth multipliers 404j and 404k. In addition, the pixels written in the sixth flip-flop 403f are outputted to the twentieth multiplier 404l.

The seventeenth multiplier 404l multiplies the second pixel outputted from the fourth flip-flop 403d by a coefficient value of $2/3$, and then outputs the result to the fourth adder 404e. The eighteenth and nineteenth multipliers 404j and 404k each multiply the third pixel outputted from the fifth flip-flop 403e by a coefficient value of $1/3$ and then output the results to the fourth and fifth adders 404e and 404f. The twentieth multiplier 404l multiplies the fourth pixel outputted from the sixth flip-flop 403f at every line by a coefficient value of $2/3$, and then outputs the result to the fifth adder 404f. Thereafter, the fourth and fifth adders 404e and 404f add the second pixel, the third pixel, and the fourth pixel obtained from the fourth, fifth and sixth flip-flops 403d–403f, and then outputs the results to the third multiplexer 404g, so that the third multiplexer 404g alternately selects a corresponding pixel at every fourth clock signal.

The video data selected thereby at every fourth clock signal are alternately written into the sixth and seventh FIFOs 405a and 405b of the fourth data storing unit 405, and a luminance level value outputted is inserted into the left-side and the right-side of the video signal by the side panel inserting unit 406. The video data with the luminance level values are then written into the third field memory unit 407.

As described above, the screen aspect ratio conversion apparatus according to the present invention is directed to more easily performing a zoom function and a horizontal compression function by performing a line interpolation and a horizontal compression using a line interpolation method and a pixel compression method in a wide screen television having a screen aspect ratio of 16:9. In addition, it is possible to perform still and double picture functions in accordance with a reading method of stored video data by processing and storing a signal before an operation of a field memory.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. An apparatus for converting a screen aspect ratio, comprising:

scanning line processing means for generating a write/read signal and first and second selection control signals in accordance with horizontal synchronous signals inputted thereto;

data storing means for selectively storing digital video data in accordance with the first selection control signal and the write/read signal generated by the scanning line processing means;

line interpolation means for multiplying video data with respect to the current and next three lines of data outputted from the data storing means by coefficient values;

line selection means for sequentially selecting at every line video data interpolated by the line interpolation means, and video data obtained by the data storing means, in accordance with the second selection control signal;

sum means for summing video data obtained by the line selection means;

horizontal synchronous count means for counting a start portion of a horizontal synchronous signal to be zoomed and for generating a write enable signal when the horizontal synchronous signal reaches a zooming region; and field memory means for storing video data which are zoomed to 3:4 by the data sum means in accordance with the write enable signal of the horizontal synchronous count means.

2. The apparatus of claim 1, wherein said scanning line processing means includes:

clock generating means for generating a write signal whenever a horizontal synchronous signal is inputted and outputting the write signal to the data storing means;

second frequency multiplying means for multiplying the write signal of the clock generating means with a second predetermined value and outputting the multiplied write signal to the data storing means;

first frequency multiplying means for multiplying the inputted horizontal synchronous signals with a first predetermined value;

module count means for counting the horizontal synchronous signals multiplied by the first frequency multiplying means, and generating the second selection control signal;

counting means for generating the first selection control signal after counting the horizontal synchronous signals inputted thereto; and switching means for selectively switching in accordance with the first selection control signal of the counting means and for outputting digital video data inputted thereto to the data storing means.

3. The apparatus of claim 1, wherein said data storing means is provided with two identical line memories.

4. The apparatus of claim 1, wherein said line interpolation means includes:

first through third multipliers for multiplying video data outputted from the data storing means by the coefficient values (K) of $1/4$, $2/4$, and $3/4$, respectively; and fourth through sixth multipliers for multiplying video data outputted from the data storing means by the coefficient values (1−K) of $3/4$, $2/4$, and $1/4$, respectively.

5. The apparatus of claim 1, wherein said line selection means includes:

first multiplexer means for selectively selecting video data outputted from the data storing means, video data outputted from the first through third multipliers, respectively, and a ground electric potential, in accordance with the second selection control signal; and second multiplexer means for selectively selecting video data outputted from the data storing means, video data outputted from the fourth through six multipliers of the line interpolation means, and a ground electric potential, in accordance with the second selection control signal.

6. The apparatus of claim 1, wherein the second selection control signal generated from said scanning line processing means is outputted in a form of three bits.

7. The apparatus of claim 2, wherein at least one of the first and second predetermined values used in said first and second frequency multiplying means is 4/3.

8. The apparatus of claim 5, wherein said first multiplexer means sequentially selects the coefficient values of 1, ¼, ²⁄₄, and ¾ with respect to the first three lines of video data and sequentially selects the coefficient values 0, ¾, ²⁄₄, and ¼ for the next three lines of the video data, in accordance with the second selection control signal.

9. The apparatus of claim 5, wherein said second multiplexer means sequentially selects the coefficient values of 0, ¾, ²⁄₄, and ¼ with respect to the first three lines of video data and sequentially selects the coefficient values of 1, ¼, ²⁄₄, and ¾ for the next three lines of the video data in accordance with the second selection control signal.

10. The apparatus of claim 2, wherein said count means divides the horizontal synchronous signals into two components to output the first selection control signal.

11. The apparatus of claim 2, wherein said switching means selectively outputs the digital video data input thereto to first and second FIFOs of said data storing means in accordance with the first selection control signal of the counting means.

12. The apparatus of claim 2, wherein said counting means counts the number of horizontal synchronous signals input thereto at every line and generates digits ranging from zero (0) to two (2) as the first selection control signal.

13. The apparatus of claim 2, wherein said switching means selectively outputs the digital video data input thereto through three paths to first, second and third FIFOs of said data storing means in accordance with the first selection control signal.

14. The apparatus of claim 1, wherein said data storing means includes first, second and third line memories for selectively storing the video data with respect to three lines of video data inputted thereto.

15. The apparatus of claim 2, wherein said module count means generates the second selection control signal of two bits.

16. The apparatus of claim 14, wherein said line interpolation means includes:

first and sixth multipliers for multiplying the video data output from the first line memory of said data storing means by ¼;

second and third multipliers for multiplying the video data output from the second line memory of said data storing means by ¾ and ²⁄₄, respectively; and fourth and fifth multipliers for multiplying the video data output from the third line memory of the data storing means by ²⁄₄ and ¾, respectively.

17. The apparatus of claim 16, wherein said data sum means includes:

a first adder for adding the video data from the first and second multipliers of the line interpolation means;

a second adder for adding the video data from the third and fourth multipliers of the line interpolation means; and a third adder for adding the video data from the fifth and sixth multipliers of the line interpolation means.

18. The apparatus of claim 17, wherein said line selection means selects the video data output from the first line memory of said data storing means and outputs of the first through third adders, in accordance with the second selection control signal of two bits generated by the module counting means.

19. The apparatus of claim 17, wherein a sum of two of the coefficient values which are multiplied with video data is one (1).

20. An apparatus for converting a screen aspect ratio, comprising:

pixel compression control means for generating first through fourth selection control signals and a writing enable signal in accordance with horizontal synchronous signals inputted thereto;

first data storing means for selectively storing video data inputted thereto in accordance with the fourth selection control signal outputted from the pixel compression control means;

pixel compression means for combining video data outputted from the first data storing means into three pixels by combining the video data at every fourth pixel and selectively outputting the combined video data in accordance with the second selection control signal of the pixel compression control means;

second data storing means for selectively storing pixel data obtained by the pixel compression means in accordance with the write enable signal of the pixel compression control means;

side panel inserting means for inserting a luminance level value of a side panel, which is previously set in accordance with a detection of an average pixel level or an average beam current level, into the pixel data inputted thereto from the second data storing means in accordance with the third and fourth selection control signals of the pixel compression control means; and field memory means for storing an output of the side panel inserting means and outputting a horizontally compressed digital video signal.

21. The apparatus of claim 20, further comprising:

a random access memory for generating a luminance level selection control signal in accordance with the detection value of an average pixel level or an average beam current beam level; and luminance level selecting means for selecting a predetermined value from luminance level values in accordance with the luminance level selection control signal outputted from the random access memory and outputting the selected predetermined value to the side panel inserting means.

22. The apparatus of claim 20, wherein said pixel compression control means includes:

clock generating means for generating a clock pulse whenever a horizontal synchronous signal is inputted;

module counting means for counting the number of clock pulses outputted from the clock generating means, generating the second selection control signal of two bits according to the count, and outputting the second selection control signal to the pixel compression means;

Oring device for ORing the second selection control signal of two bits outputted from the module counting means and generating the write enable signal;

clock counting means for counting the clock pulses outputted from the clock generating means up to a set value and for generating the fourth selection control signal;

count means for dividing a clock pulse of the clock generating means to generate the first selection control signal;

horizontal synchronous counting means for counting at every line the horizontal synchronous signals and generating the third selection control signal; and first switching means for selectively directing digital video data inputted thereto in accordance with the fourth selection control signal of the clock counting means, into the first data storing means.

23. The apparatus of claim 20, wherein said first data storing means includes first and second flip-flops.

24. The apparatus of claim 23, wherein said pixel compression means includes:

second and third multipliers for multiplying video data outputted from the first flip-flop of the first data storing means by coefficient values of $\frac{1}{3}$ and $\frac{2}{3}$, respectively;

first and fourth multipliers for multiplying video data outputted from the second flip-flop of the first data storing means by coefficient values of $\frac{2}{3}$ and $\frac{1}{3}$, respectively;

a first adder for adding pixel values obtained by the third and fourth multipliers;

a second adder for adding pixel values obtained by the third and fourth multipliers;

multiplexer means for selectively selecting the pixel values from the first and second adders, the video data outputted from the second flip-flop, and a ground electric potential, in accordance with the second selection control signal of two bits outputted from the pixel compression control means; and second switching means for selectively writing a pixel selected by the multiplexer means in accordance with the third selection control signal of the horizontal synchronous count means, into the second data storing means.

25. The apparatus of claim 24, wherein said side panel inserting means includes:

third switching means for selectively outputting video data output from the second data storing means in accordance with the third selection control signal outputted from the pixel compression control means; and fourth switching means for selectively outputting the video data from the third switching means and a luminance level value of the luminance level selection means in accordance with the fourth selection control signal to generate a mixed video signal to the field memory means.

26. The apparatus of claim 20, wherein said second data storing means includes two identical line memories being selected in accordance with the write signal of an ORing device.

27. The apparatus of claim 22, wherein said count means includes a Tflip-flop.

28. The apparatus of claim 22, wherein said count means includes a module counter for counting clock signals generated by the clock generating means and generating digits from zero (0) to three (3) as the first selection control signal.

29. The apparatus of claim 28, wherein said first switching means includes a switch for dividing digital video data input thereto into four parts.

30. The apparatus of claim 23, wherein the first data storing means includes first through fourth identical Dflip-flops for selectively storing video data from the first switching means, the Dflip-flops directly outputting a first pixel of stored data to the multiplexer means.

31. The apparatus of claim 30, wherein said first and fourth multipliers multiply second and fourth pixel values obtained by the second and fourth flip-flops by a coefficient value of $\frac{2}{3}$, and said second and third multipliers multiply a third pixel obtained by the third flip-flop by a coefficient value of $\frac{1}{3}$.

32. The apparatus of claim 24, wherein said multiplexer means sequentially selects a ground electric potential, an output of the first flip-flop, an output of the first adder, and an output of the second adder, in accordance with the second selection control signal.

33. The apparatus of claim 24, wherein a sum of two of the coefficient values which are multiplied by the first through fourth multipliers is 1.

* * * * *